United States Patent [19]

Pate et al.

[11] Patent Number: 4,647,074
[45] Date of Patent: Mar. 3, 1987

[54] FLEXIBLE CONDUIT SYSTEM

[75] Inventors: Harold T. Pate, Cleveland; Helmut P. Fochler, Chagrin Falls, both of Ohio

[73] Assignee: Indian Head, Inc., New York, N.Y.

[21] Appl. No.: 709,425

[22] Filed: Mar. 7, 1985

Related U.S. Application Data

[62] Division of Ser. No. 78,376, Sep. 24, 1979, Pat. No. 4,524,999, which is a division of Ser. No. 875,229, Feb. 6, 1978, Pat. No. 4,248,459.

[51] Int. Cl.[4] ............................................. F16L 41/00
[52] U.S. Cl. ..................................... 285/64; 285/162; 285/419; 285/903
[58] Field of Search ................. 285/DIG. 4, 419, 162, 285/161, 158, 150, 64, 903; 248/74.1, 74.3; 174/65 R, 65 G, 72 R

[56] References Cited

U.S. PATENT DOCUMENTS

| | | | |
|---|---|---|---|
| 1,275,439 | 8/1918 | Johnson | 285/150 |
| 3,099,054 | 7/1963 | Spiro | 24/16 PB |
| 3,711,633 | 1/1973 | Ghirardi et al. | 174/72 A |
| 3,831,985 | 8/1974 | Oostenbrink | 285/162 |

FOREIGN PATENT DOCUMENTS 2257848  8/1975  France .............................. 285/162

Primary Examiner—Thomas F. Callaghan
Attorney, Agent, or Firm—William R. Laney

[57] ABSTRACT

A system of flexible conduit and fittings useful particularly, though not exclusively, for conveying, supporting and connecting electrical service cables and wires. The system includes a corrugated, synthetic resin conduit which is flexible and mechanically strong, connector sleeves for clampingly engaging sections of the corrugated conduit in end-to-end relation, and hanger sleeves for clampingly engaging the conduit and suspending it from a wall or similar surface. A novel electrical outlet box is provided and includes internally toothed conduit-receiving inlet fittings for securely engaging an end of the conduits in inlets to the box.

2 Claims, 16 Drawing Figures

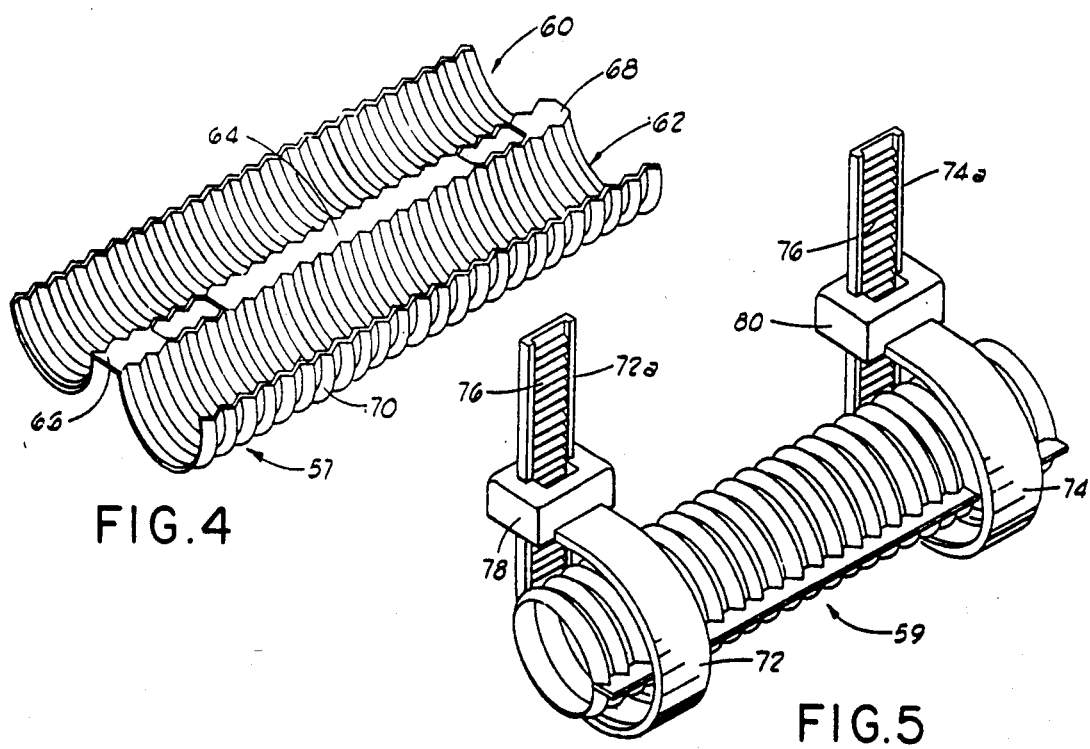
FIG.4
FIG.5
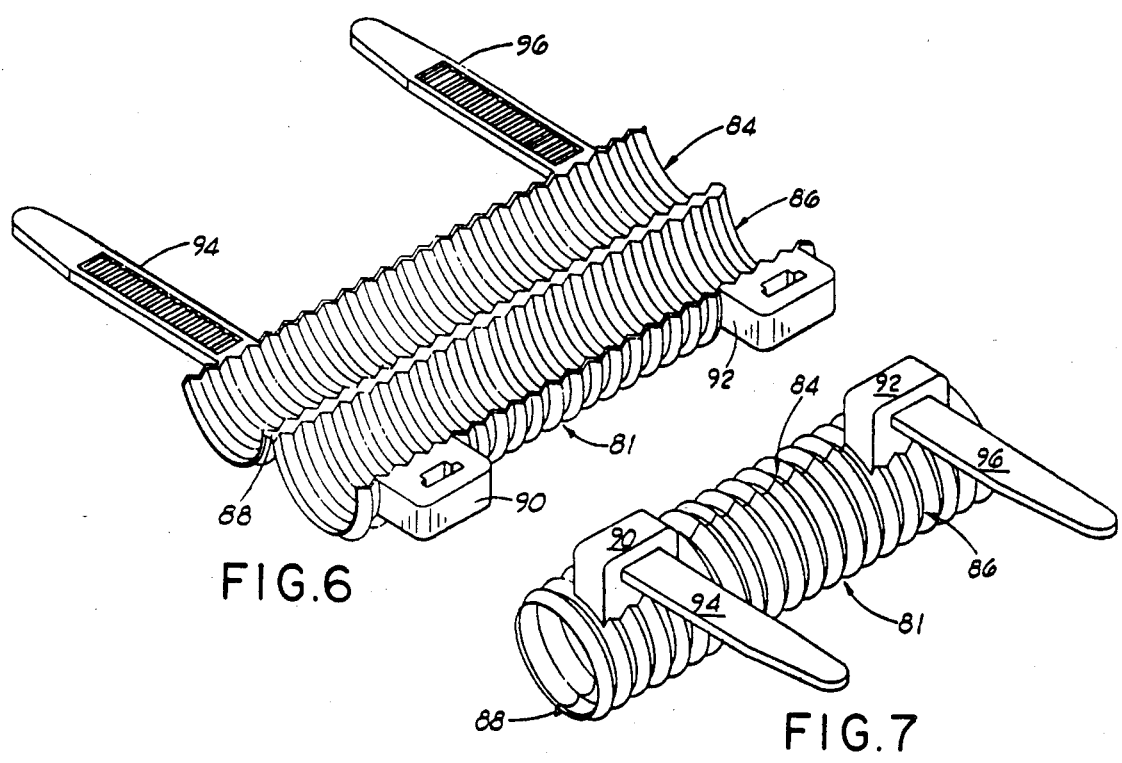
FIG.6
FIG.7

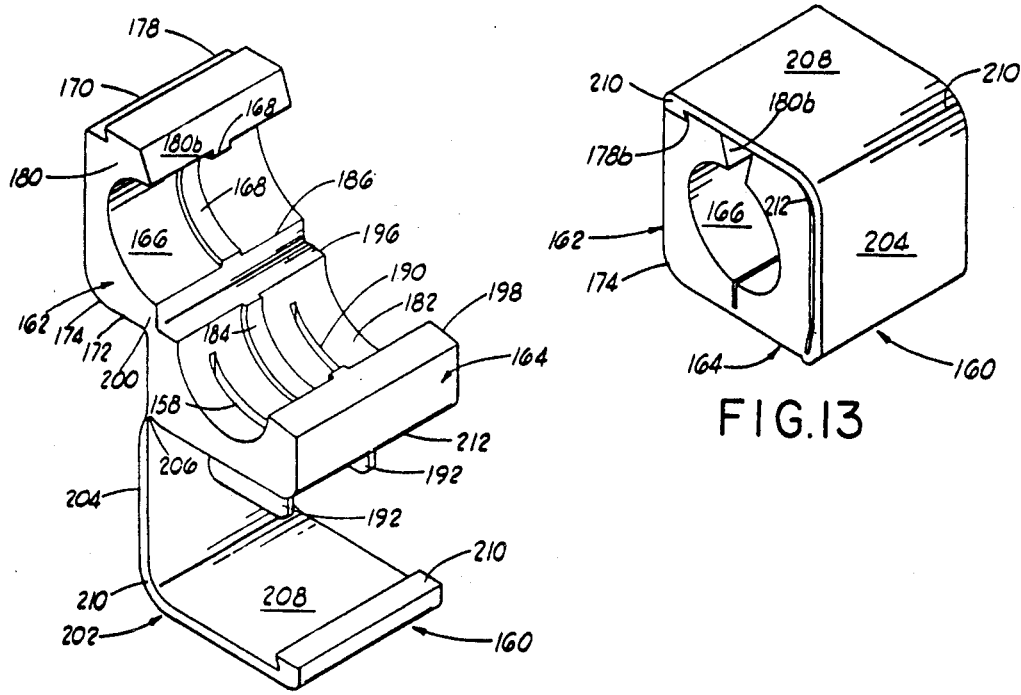
FIG.12
FIG.13
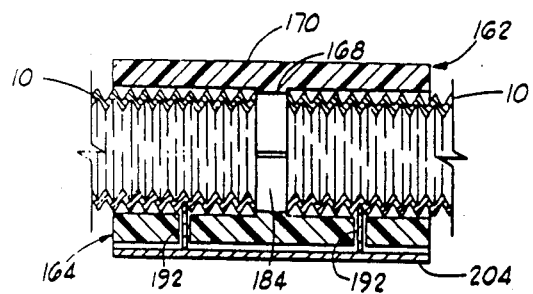
FIG.14

FLEXIBLE CONDUIT SYSTEM

This application is a division of application Ser. No. 06/078,376, filed Sept. 24, 1979 and now U.S. Pat. No. 4,524,999 which is a divison of application Ser. No. 05/875,229, filed Feb. 6, 1978 and now U.S. Pat. No. 4,248,459.

BACKGROUND OF THE INVENTION

1. Field of the Invention

This invention relates to protective channel or conveyance systems for conduits, and more particularly, but not by way of limitation, to corrugated sheathing systems for loosely receiving electrical conductors extended between remotely spaced locations.

2. Brief Description of the Prior Art

The National Electrical Code in use in the United States contains certain specific and exacting provisions relative to the types of power cable and electrical conduits which can be used in certain wiring situations and cable conveyance situations, and includes specifications and criteria to be observed in encasing conductors, electrical wires and cables within certain nonmetallic jackets enclosing conduits. Such specifications apply to both surface extensions of cables or conductors in which the cables or conductors and surrounding nonmetallic jackets are mounted directly on the surface of walls or ceiling, and also aerial extensions in which a supporting cable is used to hang or suspend a cased or jacketed electrical cable or conductor. The jackets required for the accommodation of such electrical cable and conductors are, of course, in addition to being nonmetallic, flexible so that the necessary turns or bends required to carry the cable over a predetermined course can be utilized. Good flexibility is thus required of the jacket or conduit which is to contain the electrical cable. It is further required, of course, that where the nonmetallic jackets or conduits are arranged in end-to-end relation to extend the total length thereof, fittings used for connections shall be such that the electrical conductors are not exposed between the lengths of the conduits or at the fittings. It is also required that at the terminal point of each conductor, a fitting or box which completely covers the end of the assembly shall be used.

As a result of certain limitations of structural strength believed to characterize such nonmetallic conduits as those made of polyvinyl chloride and other thermoplastic materials, the specifications of the code require that conduit having a nominal diametric size of ½ inch through one inch be supported at intervals which do not exceed 3 feet between points of support. Also, in order to avoid short circuiting and fire hazards, the brackets used to support spans of the enclosing conduits are required to be attached to woodwork or plaster, and are not permitted to contact any metalwork or other electrically conductive material. Other requirements exist for aerial cable assemblies supported upon a messenger line or cable.

In the case of metallic conduits or raceways used to carry electrical conductors, it is required that contact with similar metals (by the metallic raceway) be avoided in order to eliminate the possibility of the occurrence of galvanic action. Also, certain restrictions are provided upon the manner in which metallic raceways can be placed in contact with, or buried in, the earth. These restrictions are based upon the possibility of deterioration under conditions of corrosion and rusting.

Due to the propensity of such metal raceways to crimp or become distorted when they are bent through angles of 90° or more, the code specifications require that installations which include such bends avoid crimping of the raceway in a manner which will reduce the effective internal diameter thereof. To this end, limitations are placed on the size of the radius of curves defined by the inner edge of the metallic raceway in certain installations.

In certain types of installations which use rigid metallic conduit, the material of which the conduit or raceway is constructed, must be flame retardent, resistant to impact or crushing, resistant to distortion from heat under conditions likely to be encountered in service, and resistant to sunlight. It must also, when used underground, be resistant to moisture and corrosive agents, and sufficiently strong to withstand abuse, such as by impact or crushing loads. Rigid nonmetallic conduit or raceways are required to be supported along their length at each three foot interval in the case of one-half inch to one inch diameter conduit, and supported at from five up to about eight foot intervals for six inch diameter conduit. Bends made in such rigid nonmetallic conduit are also required to be formed in such a way that no crimping or reduction in internal diameter of the conduit results.

In Australian Pat. No. 155,417, an electrical wiring system is disclosed suitable for installation in building structures, and includes at least one central conduit box and a plurality of tubular conduits extending from the box for receiving insulated electrical conductors. The tubular conduits in each case include at least one relatively short piece of corrugated flexible tubing, and at least one relatively long piece of rigid tubing connected in a relationship such that there is a piece of the flexible tubing interposed between the conduit box and the adjacent end of a piece of the rigid tubing. The ends of the rigid tubing are threaded suitably to form a threaded interlock with the corrugations of the flexible sections of tubing.

U.S. Pat. No. 3,936,417 to Ronden is directed to a polyvinyl chloride pipe or conduit which is sufficiently flexible to permit it to be coiled up for transport and handling purposes, but has sufficiently high impact and tensile strength to satisfy the most stringent requirements for commercial installation. The composition prescribed in this patent also has a high distortion temperature.

In some instances, such as in a flexible cable shield developed by IBM and disclosed in the IBM Technical Disclosure Bulletin, Volume IX, No. 2, July of 1966, flexible corrugated cable shields or conduits have been made in two semicylindrical parts which can be folded into a cylinder about an interconnecting hinge, or coupled together by pairs of mating flanges located at opposite sides of the two semicylindrical parts.

A modular cellular conduit assembly consisting of a plurality of corrugated conduit or pipe sections adapted for use as an underground installation for carrying telephone lines, electrical lines and similar conductors is described in U.S. Pat. No. 3,693,664. The individual corrugated pipe or conduit sections used in the assembly are each flexible to facilitate shipment and installation.

A desideratum which existed for a number of years, and was allegedly solved in 1955 by the patentees in U.S. Pat. No. 2,728,356, was the fabrication of a large diameter, thin walled flexible plastic tubing. A difficulty which existed with tubing of that sort as it had been previously provided was that when subjected to bending, it tended to undergo buckling or crimping, thus undesirably reducing the internal diameter of the tubing. The patentees proposed to overcome the problem by providing a plurality of contiguous corrugations in the tubing in which the minimum radius curvature of any portion of the ridges and valleys of the corrugations of the tubing was at least three times the wall thickness at that portion of the corrugated tubing. The patentees provided, moreover, that the crest of the ridges and valleys of the corrugations must constitute long arcs of at least 150°, and not more than 270°. The ridges and valleys of the corrugations were each arcs formed about a radius many times the thickness of the tubing wall. Further, the patentees contemplated that in the most preferred form, the ridges and valleys of the corrugation have an identical radius. This allegedly resulted in uniform distribution over a wide area of the stresses arising from bending of the flexible tube, without a concentration of stress in any one narrow zone.

U.S. Pat. No. 3,060,069 discloses a plastic corrugated tubing useful for enclosing electrical conductors, and particularly of value in providing heat insulation for high resistance electrical conductors.

A corrugated flexible conduit which can be transversely flexed or bent without danger of collapsing or crimping, but which is incapable of undergoing axial stretch, is disclosed in U.S. Pat. No. 2,891,581. This tubing, however, is made of a rubber composition.

An objectionable characteristic of many types of corrugated tubing proposed as raceways or sheaths for electrical conductors in the prior art is that after bending through a relatively short radius, a tendency exists for the tubing to spring back or to undergo a reduction in radius of curvature at the bend location due to the elastic properties of the material, and the nature of the corrugations formed therein. This difficulty is allegedly overcome by the particular material of construction used in a corrugated tubing having unconventional corrugations therein, as shown and described in U.S. Pat. No. 3,908,704. In short, the side walls of each corrugation are of unequal length, or stated differently, the principal axis of each corrugation extends at an acute angle to the longitudinal axis of the tubing or conduit in which the corrugations are formed. This enables each corrugation to fold in under an adjoining corrugation without kinking or reduction in the effective internal diameter of the tubing when bends are made on a very small radius. A suitable plastic of which this tubing may be made is flexible polyvinyl chloride. It is pointed out in the patent that where the corrugated tubing is used as a cable or harnessed dielectric for conductors, a substantial advantage is obtained as a result of the very good dielectric properties of the plastic of which the tubing is made.

U.S. Pat. No. 3,132,415 indicates it as a criteria of corrugated electrical sheathing or conduits that such conduits be manually coilable in bends of various radii which can be as short as five times the outside diameter of the conduit if necessary. It is also desirable that the conduit be sufficiently resilient that it can be restored to its original straight form, without residual bend deformations as it is installed. The conduit has high impact resistance (of the order of 0.9 foot-pounds per inch according to ASTM D-256). The corrugated conduit or conductor made in accordance with this patent is said to be capable of readily elongating and contracting with temperature changes, without bowing out between points of support, or buckling at supports. Moreover, the conduit can elongate or shorten as bridge members move as a result of expansion or contraction, without any harm being done to the assembly.

A corrugated electrical conduit for containing electrical conductors is disclosed in U.S. Pat. No. 3,892,912. In this conduit, the corrugations have flat troughs and crests which extend parallel to the axis of the conduit, and the side walls of each of the corrugations are of equal length. The crests, however, are of greater length, as measured longitudinally along the conduit, than are the troughs.

The standards and specifications established by Underwriters Laboratories for rigid nonmetallic conduits constructed of polyvinyl chloride, polyethylene and similar materials require that the conduit be used at a temperature not higher than 50° C. with wiring rated, in any case, not higher than 90° C. The specifications further provide that such conduit or fittings shall provide a smooth internal raceway for the pulling in of wires and cables, and that such conduits shall not be threaded. For a so-called heavy wall PVC conduit, specifications of Underwriters Laboratory require that a wall thickness ranging from 0.109 to 0.129 inch be characteristic of conduit having a nominal ½ inch diameter, and that a wall thickness ranging from 0.28 to 0.314 be characteristic of heavy wall PVC conduit having a nominal diameter of 6 inches. For a so-called thin-walled PVC conduit, the ½ inch conduit must have a wall thickness ranging from 0.060 to 0.080 inch. Four inch conduit of the thin-walled type must have a wall thickness of from 0.15 to 0.17 inch.

The Underwriters Laboratory specifications further require that elbow bends in a conduit effected through connection of elbows to a straight section of the conduit be such that the bend is free of kinks and creases. It is further required that for this straight walled, noncorrugated conduit, no bends shall be sharper than 90°. For a ½ inch conduit, the radius of a bend in the conduit can be no smaller than four inches. For a six inch conduit, the radius needs to be no smaller than thirty inches. For all types of PVC conduit, the tensile strength must be not less than 5,500 pounds per square inch. The specifications and standards of Underwriters Laboratory further provide certain crushing specifications. For example, a ½ inch straight wall conduit must not undergo a reduction of more than 30% in its internal diameter when a six inch specimen of the conduit is subjected to a 1000 pound loading imposed upon the central portion conduit. For thin walled PVC conduit, the same reduction in internal diameter must not be exceeded when a load of 300 lbs. is centrally imposed upon a six inch specimen. For a six inch diameter conduit, the specified reduction in internal diameter must not be exceeded under a load of 850 lbs. in the case of the heavywalled conduit. Certain impact strength requirements are also imposed upon both the heavy-walled and thin-walled conduit.

Corrugated conduit suitable for underground burial and for the containment and conveyance of telephone cables and the like is manufactured and marketed under the trademark "CORFLO" by Haskon, Inc. of Middletown, Del. The CORFLO underground corrugated duct is claimed to have high crush resistance, and high flexibility which allows elbows and bends to be easily formed in the duct. The CORFLO corrugated duct is made of high density polyethylene, and is sold in sizes of from 1½ inches up to 4 inches. The impact resistance of the CORFLO polyethylene corrugated duct ranges from about 40 foot-pounds for 1½ inch duct up to about 150 foot-pounds for 4 inch duct as determined by ASTM D-2444-70 TUP B.

BRIEF DESCRIPTION OF THE PRESENT INVENTION

The present invention provides a system of flexible, synthetic resin conduit and fittings useful particularly, though not exclusively, for conveying, supporting and connecting electrical service cables and wires between separated locations of supply and service. The system includes a unique, corrugated, synthetic resin conduit which is very flexible and mechanically quite strong, but which is thin-walled and light, and can easily be manually manipulated and installed. Connector sleeves are provided for clamping sections of the corrugated conduit in end-to-end relation to prevent axial slippage, and hanger sleeves are included in the system for clamping the conduit in a non-slip engagement, and suspending it from a wall or similar surface. The connector sleeves and hanger sleeves are made of electrically non-conductive material. A novel electrical outlet box is provided, and includes internally toothed, conduit-receiving inlet fittings integrally formed in the box for securely engaging ends of the corrugated conduits with inlets to the box by interfitting and physical interference between the corrugations of the conduit and the internally toothed, conduit-receiving inlet fittings.

An important object of the invention is to provide an improved system of flexible, synthetic resin conduit and fittings used in combination therewith, which conduit can be manually bent to a relatively sharp bend of low radius without the elastic memory of the material of construction of the conduit resulting in its positional deviation, after bending, in the direction of its original configuration.

A further object of the invention is to provide an improved flexible conduit of synthetic resin which, though capable of being manually bent into a variety of configurations involving relatively sharp bends, can be suspended at spaced locations on a wall or other support structure in such a way that it will undergo a relatively small deflection from linearity when so suspended, and when carrying electrical cables or conduit.

A further object of the invention is to provide a rigid polyvinyl chloride corrugated conduit which has a relatively thin wall (ranging from about 0.1 inch to about 0.2 inch), but has a high impact strength and high crush resistance. The conduit of the invention can be bent through bends having a radius as small as four inches without crimping or undergoing any reduction in internal diameter. The tensile strength of the PVC corrugated conduit used in the system of the invention is in excess of 5000 pounds per square inch.

Another object of the invention is to provide a system of flexible conduit and fittings which can be bent into various shapes to permit its installation in a great variety of locations requiring changes of direction of the conduit, and which can be very quickly and easily installed as a result of the manner in which the fittings utilized with teh conduit cooperate with the conduit as the system is installed.

Additional objects and advantages will become apparent as the following detailed description of certain preferred embodiments of the invention is read in conjunction with the accompanying drawings which illustrate such preferred embodiments.

GENERAL DESCRIPTION OF THE DRAWINGS

FIG. 4 is a perspective view of one different form of connecting clamp which can be used in one embodiment of the conduit and fitting system of the invention and illustrated this connector clamp as it appears when opened apart preparatory to receiving the opposed end portions of a pair of sections of corrugated conduit disposed in end-to-end relation.

FIG. 5 illustrates the connecting clamp shown in FIG. 4 as it appears when it is in its closed position, and as it is used in conjunction with synthetic resin closure straps forming a part of the connector clamp.

FIG. 6 is a perspective view of yet another form of connecting clamp useful in another embodiment of the system of the invention, and illustrating this connecting clamp as it appears when it is opened to its conduit-receiving position.

FIG. 7 is a perspective view of the connecting clamp shown in FIG. 6, illustrating this clamp as it appears when it is in its closed, conduit-engaging position.

FIG. 12 is a perspective view of another embodiment of a connector clamp useful in the present invention and showing the clamp in its opened position.

FIG. 13 is a perspective view of the connector clamp of FIG. 12 showing the clamp in its closed position.

FIG. 14 is a sectional view through the connector clamp shown in FIG. 13, and showing in section a pair of corrugated conduit sections clamped thereby.

DETAILED DESCRIPTION OF PREFERRED EMBODIMENTS OF THE INVENTION

Figure 1:
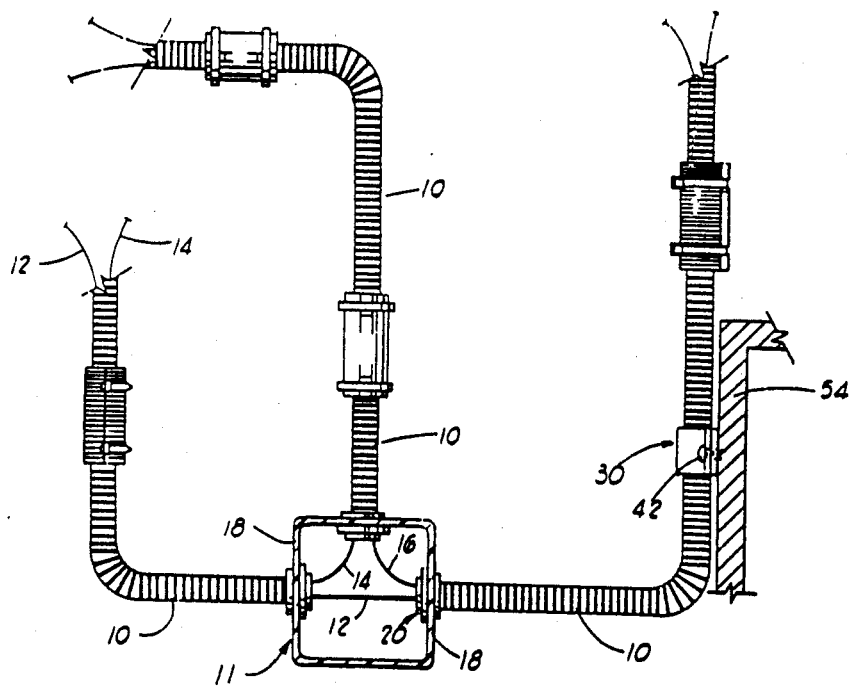
FIG. 1 is a view in elevation of one arrangement of a system of flexible conduit and fittings of the invention, and illustrating in section, a wall to which a portion of the system is mounted, and an electrical box forming a portion of the system.
Figures 2, 3:
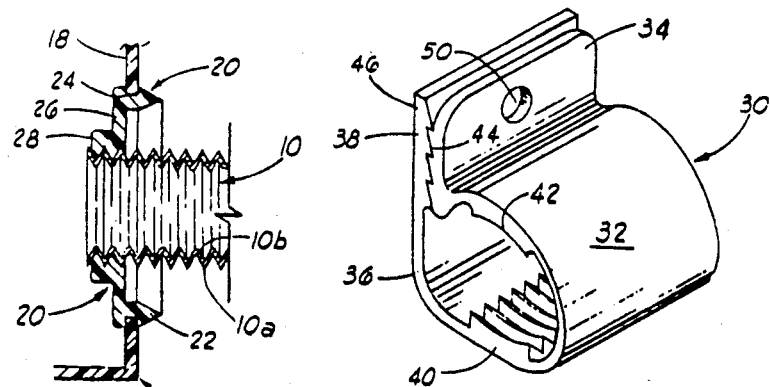
FIG. 2 is a detail view illustrating, in section, the manner in which an end portion of a corrugated conduit forming a part of the system is engaged by a conduit-receiving inlet fitting used at an inlet opening in an electrical box.
FIG. 3 is one form of hanger sleeve, constructed in accordance with the present invention, and forming a part of the flexible conduit and fittings system of the invention.

Referring initially to FIG. 1 of the drawings, the flexible conduit and fitting system of the invention includes a plurality of lengths or sections 10 of corrugated conduit. The corrugated conduit sections 10 each have a longitudinal cross-sectional configuration as illustrated in FIG. 2 of the drawings, and preferably include a series of corrugations having relatively sharp crests 10a which are interconnected by relatively sharp or V-shaped troughs 10b. The corrugated conduit 10 is preferably constructed of polyvinyl chloride which is of the type referred to in the industry as rigid polyvinyl chloride, contains at least 80 percent vinyl chloride, and is preferably one of the types referred to as Type 1 or Type 2 in the specifications set forth in ASTM-D-1784-75. The corrugated conduit 10 can be of varying diametric size, including conduit having a diameter of up to six inches, but preferably is between ½ inch and 1 inch diameter.

The wall thickness of the conduit, as measured normal to the plane of one of the wall sections extending from a trough to a crest of one of the corrugations, if preferably about 0.1 inch to about 0.13 inch in the case of the ½ inch diameter conduit, up to a wall thickness, as similarly measured, of from about 0.13 inch to about 0.20 inch in the case of the 1 inch diameter conduit. This relatively thin wall thickness characteristic of the corrugated conduit, when constructed of a rigid polyvinyl chloride, permits the lengths of the conduit to be bent freely and easily by hand from a linear configuration to a selected configuration in which the bend in the conduit may define an angle as small as 90° or less. In most instances, however, installation requirements will not require bends greater than 90°. In such cases, the conduit can be bent upon a relatively small radius, if desired. For example, conduits within the preferred diametric size range of from ½ inch to 1 inch can be easily bent upon a 4 inch radius without crimping or reduction of the internal diameter of the conduit, and without fatiguing, stressing or cracking of the tensioned, radially outer wall of the conduit.

In the particular arrangement of the system illustrated in FIG. 1, several forms of fitting components used in the system are illustrated, and a novel synthetic resin electrical box 11 adapted to receive and securely engage free ends of the conduit is illustrated. Referring initially to the electrical box 11, such is here shown as being a junction box rather than a service box, and is used for receiving a plurality of electrical conductors extended through the flexible corrugated conduits. Thus, a pair of conductors 12 and 14 are extended through one of the conduit sections, with the conductor 14 then being extended into a second conduit section along with conductor 16 originating in yet a third conduit section. The three conduit sections which carry the conduits 12, 14 and 16 to the interior of the electrical box 11 are joined to side walls 18 of the box through conduit-receiving inlet fittings, designated generally by reference numeral 20, which are pressed into conduit openings in the side walls of the box.

Each of the inlet fittings 20 comprises an annular element having an axially extending annular flange 22 which gradually narrows in thickness to a relatively sharp outer edge, and which has a peripheral, radially inwardly extending groove 24 formed therearound. The groove 24 is sized to receive a circular edge of a side wall 18 of the box at the location where a large circular inlet opening is formed in the respective side wall. The inlet fitting 20 is thus interlocked by snap engagement with the respective side wall 18 of the box 11. Such snap engagement is easily effected by pressing the fitting from the inside of the box outwardly, and using the wedging action afforded by the tapered outer side of the annular flange 22 to force the side wall to a position where it will snap into the groove 24.

Each inlet fitting 20 further includes a radially inwardly extending receptor plate 26 which carries a centrally apertured hub 28 at the radially inner side thereof. The hub 28 has a large opening formed through the center thereof, and the opening is defined and surrounded by a plurality of annular serrations or sawtooth type grooves which are dimensioned to closely register with the corrugations in the flexible conduit sections 10. This engagement is illustrated in FIG. 2 of the drawings. Sufficient flexibility characterizes each of the inlet fittings 20 and the end portion of each of the conduit sections 10 to permit the end of the conduit to be forced through the opening in the hub 28 of the fitting, and into registering snap engagement with the serrations formed around the central opening in this hub. Each conduit section 10 is thus positively interlocked with the electrical box 11.

It will be understood that a suitable cover (not shown) is provided for closure of the electrical box 11 after the electrical conductors carried within the corrugated conduits 10 have been projected into the electrical box, and desired connections to, or changes of direction of, the conduits have been effected within the electrical box 11, as may be required by the particular installation.

The corrugated flexible conduit sections 10 utilized in the system of the invention are, in many conventional installations, required to undergo one or more bends of 90°, and to be supported in a horizontal course at vertical elevations on walls, or in a particular vertical course up the side of a wall. This type of arrangement is illustrated in FIG. 1, where it will be noted that three of the right angle bends, which can be easily accomplished by manual manipulation of the sections 10, are illustrated. FIG. 1 of the drawings also illustrates a novel hanger sleeve 30 which can be used in conjunction with the corrugated conduit sections 10 for the purpose of supporting a conduit section in a fixed position on a wall.

The hanger sleeve 30 is illustrated in detail in FIG. 3. This structural element is fabricated from an electrically non-conductive synthetic resin, and preferably is rigid polyvinyl chloride of character similar to that of which the flexible conduit 10 is manufactured. The hanger sleeve 30 includes a semicylindrical body portion 52 which is joined at one longitudinal edge to a first suspension flange 34 and at the other longitudinal edge to a flat side wall 36 which is secured to, and formed integrally with, a second suspension flange 38 positioned in substantially coplanar alignment with the flat side wall.

The body portion 32 carries on the inner side wall thereof a first series of axially spaced, radially inwardly projecting triangularly cross-sectioned ribs 40 along one side thereof, and a similar second series of ribs 42 on the opposite side thereof. The ribs 40 and 42 are geometrically configured to register with the corrugations in the flexible conduit sections 10 at such time as the hanger sleeve is closed about a section of the flexible conduit to bring the ribs 40 and 42 into mating engagement with the corrugations of the conduit section. The closed portion of the hanger sleeve 30 is illustrated in FIG. 3. It will further be noted in referring to FIG. 3 that the suspension flanges 34 and 38 each carry facing, interlocking serrations or ribs 44 and 46, respectively, and that these interlocking ribs cause the suspension flanges, when in abutting registering contact, to index screw-receiving apertures 50 formed through the suspension flanges in alignment with each other.

In use, the hanger sleeve 30 is first opened by separating the suspension flange 34 and 38 sufficiently to permit an intermediate portion of a section 10 of the corrugated flexible conduit to be inserted between these flanges, and into the body portion 32 of the hanger sleeve. The hanger sleeve 30 is then closed about the conduit by pressing the suspension flanges 34 and 38 into registering contact with each other. The character of the synthetic resin material of which the hanger sleeve 30 is constructed assures that such closure will firmly clamp the hanger sleeve about the conduit section 10. After such engagement of the hanger sleeve with the conduit section 10, a suitable screw 42 can be inserted through the aligned screw receiving apertures 50 in the suspension flanges 34 and 38 and into a wall 54 or the like to mount or hang the flexible conduit section on the wall at this location in the manner illustrated in FIG. 1.

In FIGS. 4 and 5 of the drawings, one form of connector sleeve 59 used in the system of the present invention is illustrated. The connector sleeve includes a split cylindrical corrugated section of tubing which includes a semicylindrical first part 60 and a semicylindrical second part 62. The corrugated semicylindrical parts 60 and 62 are joined by a flexible, medial hinge section 64, and a pair of end hinge sections 66 and 68 which are each spaced longitudinally from the medial hinge section. The hinge sections permit the parts 60 and 62 to be folded about an axis extending longitudinally along the center line of the several aligned hinged sections so that the two parts may be moved from an open position, as shown in FIG. 4, to a closed position as shown in FIG. 5. It will be noted in referring to FIGS. 4 and 5 that each of the semicylindrical parts 60 and 62 has a plurality of contiguous, axially arranged circumferential corrugations 70 formed therealong, and these corrugations are dimensioned and shaped to facilitate registry with the corrugations of corrugated conduit sections 10.

When the two parts 60 and 62 are folded about the hinge portions 64, 66 and 68 to a closed position as shown in FIG. 5, spaces are provided between the end hinge portions 66 and 68 and the medial hinged portion 64. These two spaces facilitate the accommodation of a pair of flexible straps or bands 72 and 74. The straps 72 and 74 include respective end portions 72a and 74a which carry inwardly facing teeth 76. The teeth 76 engage, through a ratchet action, a tongue carried on the inside of engaging blocks 78 and 80 which are secured to the ends of the respective straps 72 and 74. This structure facilitates the tight securement of the straps 72 and 74 about the closed, semicylindrical parts 60 and 62 of the sleeve 59 to retain it in its closed position.

In the use of the connector sleeve, the opposed facing ends of a pair of conduit sections 10 are placed within one of the parts 60 or 62 of the connecting sleeve, and the respective conduit sections then project from opposite ends of this sleeve. After placement of the corrugated conduit sections 10 in a position in which the corrugations in the two sections mate or reigster with the corresponding corrugations 70 on one of the semicylindrical parts 60 or 62, the other part is then closed about the facing corrugated conduit sections to tightly engage the pair of conduit sections over a major portion of their periphery through registration of the corrugations. The straps 72 and 74 are then placed around the connector sleeve as shown in FIG. 5 and are tightened about the connector sleeve and the enclosed conduit section by pulling the end portions 72a and 74a through the gauging blocks 78 and 80 until a tight securement is effected.

It should be pointed out that the connector sleeve 59 shown in FIGS. 4 and 5 can also be used as a hanger sleeve for suspending or supporting a section of the corrugated conduit on a wall or ceiling. Where such usage of the sleeve is employed, suitable screws or nails are extended through the end portions 72(a) and 74(a) of the straps 72 and 74, and into the wall or ceiling to hang or suspend the sleeve at a selected location, and with it the conduit section which extends through the sleeve. It will be apparent, of course, that the sleeve 59 shown in FIGS. 4 and 5 can also function dually as a connector sleeve and as a hanger sleeve. This is to say that a pair of the corrugated conduit sections 10 can be placed with their end portions secured within the sleeve in end-to-end relation, and both sections can then be supported or suspended on a wall or ceiling in the manner described.

In FIGS. 6 and 7 of the drawings, a modified embodiment of connector sleeve 81 is illustrated. As in the connector sleeve embodiment shown in FIG. 4, a pair of semicylindrical parts 84 and 86 are utilized, and these parts are interconnected by a flexible hinge portion 88 which extends along, and interconnects, the opposed, adjacent longitudinal edges of the semicylindrical parts. The hinge portion 88 is sufficiently flexible that the semicylindrical parts 84 and 86 can be opened apart to the position shown in FIG. 6 to facilitate the insertion of a pair of conduit section ends within one of the semicylindrical parts in the manner previously described.

Figure 8:
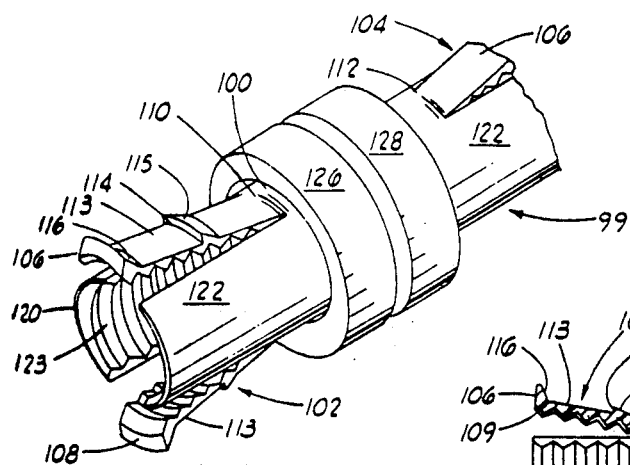
FIG. 8 is a perspective view of a form of connector sleeve which forms a part of the system of flexible conduit and fittings of the present invention.
Figure 9:
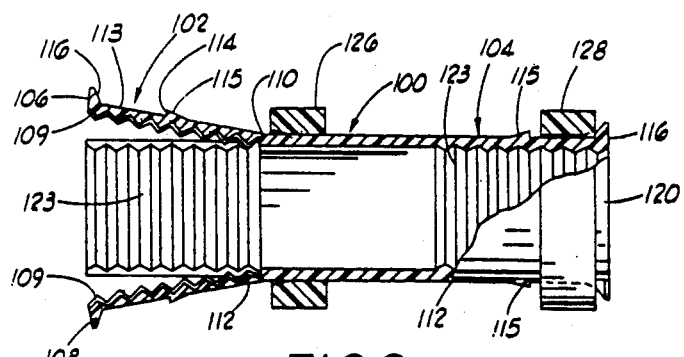
FIG. 9 is a sectional view taken through the longitudinal axis of the connector sleeve shown in FIG. 8.

In the embodiment of the connector sleeve 81 shown in FIG. 6, the semicylindrical part 86 has formed integrally thereon, and adjacent one of the longitudinal edges of the part, a pair of strap engaging blocks 90 and 92. The engaging blocks 90 and 92 function similarly to the blocks 78 and 80 previously described in referring to the connector sleeve embodiment of FIGS. 4 and 5, and thus serve to receive and engage the tooth-carrying end portions of a pair of flexible straps 94 and 96. The flexible straps 94 and 96 are formed integrally with the semicylindrical part 84 and project therefrom at a location adjacent one of the longitudinal edges of this part of the connector sleeve. When the connector sleeve 81 is in its closed position, it appears as shown in FIG. 6. It will be understood, of course, that prior to closing the connector sleeve, one or a pair of corrugated conduit sections is inserted between the semicylindrical parts 84 and 86 which function to effect interconnection of two sections, or to support a single corrugated section or a pair of sections placed in end-to-end relation. In FIGS. 8 and 9, another embodiment of connector clamp or sleeve 99 used in the system of the present invention is illustrated. The connector sleeve 99 includes a central or medial cylindrical body portion 100 which has smooth outer and inner walls, and which is connected at its opposite ends to a pair of split jawed clamping portions designated generally by reference numerals 102 and 104. Each of the split jawed clamping portions 102 and 104 is substantially identical to the other, and each includes a pair of movable jaws 106 and 108 which are hingedly connected by hinges 110 and 112 to one end of the central body portion 100 along a medial or arcuate segment of a circle. The movable jaws 106 and 108 can move, in a pivotal motion, outwardly with respect to the axis of the connector sleeve.

Each of the movable jaws 106 and 108 on the opposite ends of the connector sleeve carries a plurality of internal arcuate corrugations 109 which are shaped and dimensioned to register with the corrugations in one of the corrugated conduit sections 10. Each of the movable jaws is also provided on its outer periphery with a relief or recess 113 which lies between a pair of shoulders 114 and 116 formed on the outer side of the respective movable jaw. It will be noted that the shoulder 114 is formed by the abrupt termination of an axially sloping, arcuate rib 115 which slopes inwardly toward the body portion 100. That portion of each of the movable jaws 106 and 108 lying between the rib 115 and the respective hinge 110 and 112 by which the jaw is connected to the central body portion 100 is smooth, and constitutes a segment of the outer periphery of a cylinder.

Positioned on opposite sides of the connector sleeve 99 from each other, and between each opposed pair of movable jaws 106 and 108 are a pair of rigid, axially extending semicylindrical side walls 120 and 122. Each of the side walls 120 and 122 has a smooth outer peripheral surface formed on a segment of a cylinder, and each has internal corrugations 123 which are located to occupy a position of axial alignment with the corrugations 110 in the movable jaws when the movable jaws are closed as hereinafter explained. The corrugations 123 on the side walls 120 and 122 are also dimensioned and configured to register with the corrugations of the corrugated conduit sections 10.

Slidably mounted on the connector sleeve 99 for axial sliding movement therealong are a pair of annular collars 126 and 128. Each of the annular collars 126 and 128 is of rectangular cross-section, and each collar has a transverse dimension which is slightly smaller than the transverse dimension which is characteristic of the recess 113 as measured axially along the connector sleeve 99.

As shown in FIG. 9, the collars 126 and 128 can be slid axially along the connector sleeve 99 so that either or both of the collars pass over the respective arcuate ribs 115 on the movable jaws 106 and 108 at one end of the connector sleeve and snap into the recesses 112. In this manner, the movable jaws 106 and 108 are forced to a position of closure such that, with the rigid side portions 120 and 122, they form a closed cylinder, the interior of which is lined by the corrugations 109 and 123 carried on the movable jaws and rigid wall portions.

Figure 10:
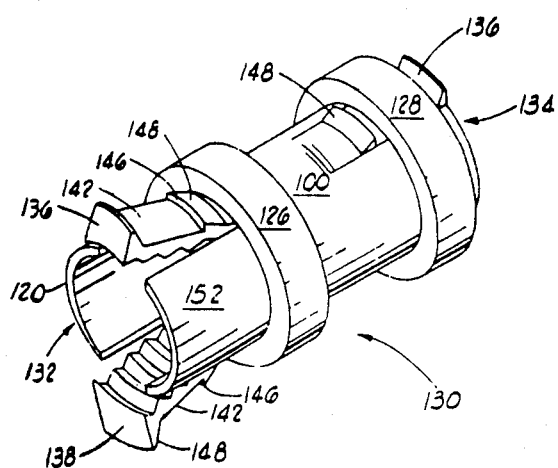
FIG. 10 is a modified embodiment of the connector sleeve illustrated in FIG. 8.
Figure 11:
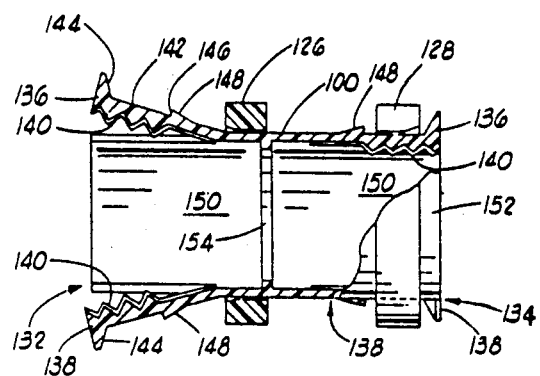
FIG. 11 is a sectional view taken along the longitudinal center line of the connector sleeve shown in FIG. 10.

A different embodiment of the connector sleeve used in the system of the invention is shown in FIGS. 10 and 11 of the drawings. The connector sleeve 130 here illustrated is similar in many respects to the connector sleeve embodiment shown in FIGS. 8 and 9, and identical reference numerals have been utilized for identifying identical parts of the sleeve. It will be noted in referring to FIG. 11 that the central cylindrical body portion 100 of the connector sleeve 130 shown in FIG. 11 is somewhat shorter than the central body portion 100 of the sleeve embodiment shown in FIG. 9. As in the case of the earlier described connector sleeve, the central body portion 130 has smooth outer and inner walls, and has slidably mounted around the outer periphery thereof a pair of annular collars 126 and 128.

The collars 126 and 128 can slide freely along the central body portion 100 and out over a pair of split jawed clamping portions, designated generally by reference numerals 132 and 134, and located at the opposite ends of the central body portion. Each split jawed clamping portion 132 and 134 is substantially identical to the other, and each includes a pair of movable jaws 136 and 138. Each of the movable jaws 136 and 138 is hingedly connected to the central body portion 100 in the manner previously described, and each jaw carries a series of internal, arcuate corrugations 140 which are shaped and dimensioned to register with the corrugations in each of the corrugated conduit sections 10. Each of the movable jaws 136 and 138 is also provided on its outer periphery with a relief or recess 142 which lies between a pair of shoulders 144 and 146. It will be noted that the shoulder 146 is formed by the abrupt termination of an axially sloping, arcuate rib 148 which slopes inwardly toward the body portion. That portion of each of the movable jaws 136 and 138 lying between the rib 148 and the respective point of hinged connection of the jaw to the central body portion is smooth, and constitutes a segment of the outer periphery of a cylinder.

Positioned on opposite sides of the connector sleeve 130 from each other, and between each pair of opposed movable jaws 136 and 138, are a pair of rigid, axially extending semicylindrical side walls 150 and 152. Each of the side walls 150 and 152 has a smooth outer peripheral surface formed as a segment of a cylinder, and a smooth inner peripheral surface similarly formed.

Projecting inwardly from the internal wall of the central body portion 100 at a location which is substantially midway between the points of hinged connection of the jaws 136 and 138 to the central body portion is an annular, radially inwardly projecting stop flange 154.

In the use of the connector sleeve 130 shown in FIGS. 10 and 11, the end portions of a pair of corrugated conduit sections 10 are inserted into opposite ends of the connector sleeve 130 until the end face of each corrugated conduit section abuts against the radially inwardly projecting stop flange 154. With the corrugated conduit sections 10 thus aligned in end-to-end relation, and abutted against the stop flange 154, the annular collars 126 and 128 can then be slid axially along the connector sleeve 130 until these collars pass up over the axially sloping, arcuate ribs 148 and into the respective recesses 142 carried on each of the movable jaws 136 and 138 at opposite ends of the connector sleeve. The corrugated conduit sections are thus clamped firmly within the connector sleeve in end-to-end relation as previously described.

Another form of connector clamp useful in the system of the invention is illustrated in FIGS. 12–14, and is designated generally by reference numeral 160. The connector clamp 160 includes a split body which is made up of a first split body portion 162 and a second split body portion 164. The split body portion 162 is characterized in having a semicylindrical internal wall 166 which has a radially inwardly projecting, arcuate, semicylindrical stop rib 168 formed centrally thereon. On its outer side, the split body portion 162 has a substantially planar surface 170 forming one side wall and intersecting another substantially planar surface 172. The surfaces 170 and 172 are joined by a longitudinally extending, radiused corner 174 which extends substantially parallel to the axis of the semicylindrical internal wall 166.

At the side of the surface 170 opposite its intersection with the radiused corner 174, a slot or groove 178 is formed in the body portion 162, and this slot or groove is slightly undercut as shown at 178b in FIG. 13. A final element of the body portion 162 is an axially extending block 180 which projects from one end of the body portion to the other, and on its internal side defines a portion of the semicylindrical inner wall 166 of the body portion. The block 180 includes a facing surface 180b which is beveled or cut along a plane which intersects at an angle, the plane in which a corresponding facing surface 186 lies on the opposite side of the body portion 162.

The body portion 164 of the connector clamp 160 is formed similarly to the body portion 162, and thus includes an internal semicylindrical wall 182. The internal semicylindrical wall 182 of the body portion 164 has a radially inwardly extending, arcuate semicylindrical stop rib 184 formed centrally thereon and in alignment with the arcuate semicylindrical stop rib 168 formed on the body portion 162. On opposite sides of the stop rib 184, and at locations spaced axially along the internal semicylindrical wall 182 of the body portion 164, a pair of radial slots 188 and 190 are formed through the body portion, and each slot is provided with a reduced transverse dimension adjacent the outer side of the body portion (not visible) in order to retain an internally flanged locking plate 192 which is slidably positioned in each of the radial slots 188 and 190. It will be noted, as hereinafter described, that the locking plates 192 can slide radially in the slots 188 and 190, and each carries a radially inner edge which is dimensioned to facilitate engagement with corrugations of the corrugated conduit sections 10 as shown in FIG. 14 and hereinafter described.

The semicylindrical inner wall 182 of the body portion 164 terminates at its opposite longitudinal edges at a pair of coplanar surfaces 196 and 198. The plane in which the surfaces 196 and 198 lie extends through the center of the cylinder upon which the semicylindrical inner wall 182 is formed. It should be pointed out that the synthetic resin used for interconnecting the body portions 162 and 164 forms a hinge 200 about which these body portions may be folded to open and close the connector clamp as hereinafter described.

Connected to the external side of the body portion 164 which is connected to the hinge portion 200 is a locking band, designated generally by reference numeral 202. The locking band 202 is generally L-shaped in configuration, and includes a first leg 204 secured by a thin hinge portion 206 to the body portion 164, and a second leg 208 which is secured at substantially a right angle to the leg 204. The legs 204 and 208 are joined through a radiused corner 210 which conforms in its radius of curvature to a radiused corner 212 formed along a longitudinal edge at the outer side of the body portion 164. At the free end of the leg 208 (that is, the end opposite its side connected to the leg 204), the leg 208 carries a latching rib 210 which is configured to snap into, and register with, the groove 178 in the manner illustrated in FIG. 13.

In the use of the connector clamp 160, as shown in FIG. 14, the end portions of a pair of corrugated conduits 10 are placed in end-to-end relation, with one side of the conduits in contact with the semicylindrical inner wall 182 of the body portion 164, and the end faces of the two conduit sections abutting the stop rib 184. The body portion 162 is then folded about the upper side of the two conduit sections 10 until the surface 180b is adjacent and faces the surface 198, and the surfaces 186 and 196 are in abutting contact, and extend substantially parallel to each other. The locking band 202 is then folded about the hinge portion 206 to cause the locking band to be wrapped about the body portion 164, and the latching rib 210 to be brought into a position of snap engagement with the recess 178. When such snap engagement is effected, the conduit sections 10 are located in end-to-end relation, and are retained firmly in this position by the connector clamp.

It will be noted in referring to FIG. 14 that as the locking band 202 is folded about the body portion 164 and positioned to facilitate the snap engagement of the latching rib 210 with the recess 178, the leg 204 comes in contact with the locking plates 192, and causes these to be moved radially inwardly through the slots 188 and 190 until the inner edges of the locking plates, which are arcuate in configuration, seat in and interlock with a pair of adjacent corrugations in the opposed conduit sections 10. Axial sliding movement of the conduit sections 10 is thus prevented by this latching engagement of the locking plates 192.

Figure 15:
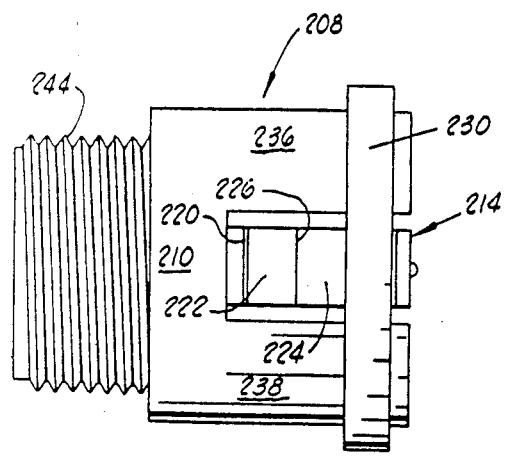
FIG. 15 is a side elevation view of another form of inlet fittings used in terminating a corrugated conduit at an opening into an electrical box in the system of the invention.
Figure 16:
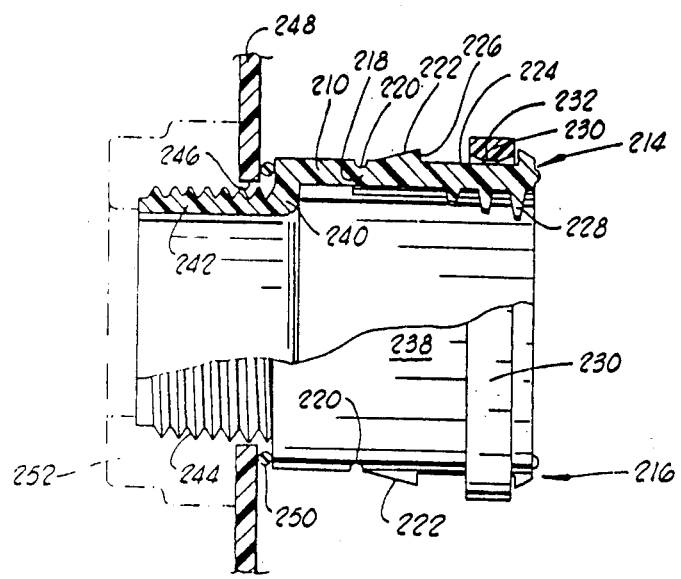
FIG. 16 is a view partially in elevation and partially in section of the inlet fitting illustrated in FIG. 15, and showing, in section, a portion of an electrical box in which the inlet fitting is mounted, and in dashed lines, a retainer bushing used to mount the fitting in the box.

Another embodiment of inlet fitting, also referred to as a male terminal adapter, is illustrated in FIGS. 15 and 16. The inlet fitting 208, as here illustrated, includes a medial cylindrical body portion 210 which is characterized in having a smooth outer peripheral wall and a smooth internal peripheral wall. The medial cylindrical body portion 210 is formed integrally, at one of its sides, with a pair of arcuately cross-sectioned clamping portions designated generally by reference numerals 214 and 216. The clamping portions 214 and 216 extend in an axial direction from the cylindrical body portion 10 and are identical in configuration to each other. Each of the clamping portions 214 and 216 thus includes a hinge portion 218 by which it is hingedly connected to the body portion 210. The hinge portion is exteriorly defined by a radially inwardly projecting groove 220 formed transversely across the clamping portion to reduce the thickness of the synthetic resin material at this location and permit flexing of the clamping portion and pivoting movement inwardly and outwardly with respect to the axis of the inlet fitting.

A ramp or beveled or inclined surface 222 extends radially outwardly from each clamping portion from a point adjacent the groove 220 to a point adjacent a rectangularly cross-sectioned recess or relief 224. At the intersection of the ramp 222 and the recess 224, a shoulder 226 is formed. On the radially inner side of each of the clamping portions, a plurality of radially inwardly projecting, axially spaced teeth 228 are formed. It will be noted that the longest of these teeth which projects the greatest radial distance into the interior of the inlet fitting is located adjacent the axial end of the respective clamping portion which is spaced most distally from the cylindrical body portion 210, and that the length of the teeth then diminishes in an axial direction toward the body portion so that that tooth located nearest the shoulder 226 is the shortest of the teeth and projects the shortest radial distance into the fitting.

Slidably mounted around the body portion 210 for sliding movement from that location into a position within the recess 224 (as illustrated in FIGS. 15 and 16) is an annular locking collar 230. The locking collar 230 includes a rib 232 which is positioned medially on the radially inner side of the locking collar, and is located between two bevels or inclined surfaces provided on the radially inner side of the locking collar. This construction permits the locking collar 230 to easily slide upwardly over the ramp 222 from the medial cylindrical body portion 210 and into the recess 224.

It will be noted in referring to FIGS. 15 and 16 that the clamping portions 214 and 216 are each disposed on opposite sides of the inlet fitting 208 illustrated in these figures so as to be spaced from each other by 180° around the inlet fitting, and that the two clamping portions are separated from each other by a pair of semi-cylindrical side portions 236 and 238. The semi-cylindrical side portions 236 and 238 are formed on segments of circles (in cross-section), and thus define with the clamping portions 214 and 216, a hollow cylindrical body which is adapted to receive an end of one of the corrugated conduit sections 10 hereinbefore described.

On the opposite side of the cylindrical body portion 210 from the side to which the side portions 236 and 238 and clamping portions 214 and 216 are attached is a necked down portion of the fitting 208 which defines a radially inwardly extending, annular shoulder 240. The shoulder 240 is joined at its inner side to an axially projecting, externally threaded nipple 242. The outside diameter of the external threads 244 formed on the nipple 242 is such that the nipple may be passed through the opening 246 formed in one of the side walls 248 of an electrical box. The radially inwardly extending shoulder 240 forms a stop or abutment preventing the remaining portion of the inlet fitting 208 from passing through the opening 246.

When the inlet fitting 208 is mounted within the opening 246 in the side wall of an electrical box, the externally threaded nipple 242 is passed through the opening 246 until the shoulder 240 abuts the O-ring 250. At this time, a threaded locking bushing 252, shown in dashed lines in FIG. 16, is threaded on the nipple 242 to firmly lock the inlet fitting within the opening 246 of the box 248.

With the inlet fitting 208 locked in position in the opening 246 in the box 248 by means of the bushing 252, the clamping portions 214 and 216 are permitted to flare out to a location which is divergent with respect to the axis of the inlet fitting. At this time, the locking band 230 has been slid along the fitting to a position where it surrounds the medial cylindrical body portion 210. The end portion of a corrugated conduit section 10 is then inserted into the open end of the fitting between the side portions 236 and 238. The lengths of the teeth 228 formed on the internal surface of each of the clamping portions 214 and 216 and projecting radially inwardly therefrom are dimensioned so that at this time the teeth closest to the pivotal axis of each of the clamping portions, though positioned closest to the axis of the inlet fitting, are shortest in length and thus do not interfere with the insertion of the end portion of the corrugated section 10 into the opened fitting.

After the conduit section has been firmly seated, in most instances against the radially inwardly extending shoulder 240, the locking collar or band 230 is slid axially along the inlet fitting 208 until it rides up over the ramps 222 on the outer surface of each of the clamping portions 214 and 216 and thus biases these clamping portions inwardly about the hinge portion 218 of each. Finally, the locking collar or band 230 is slipped into the recesses 224 so as to lock the clamping portions 214 and 216 firmly in position where they are in alignment and complete a cylindrical figure with the side portions 236 and 238. At this time, the teeth 228 firmly engage the corrugations in the corrugated conduit section 10 which has been inserted in the fitting to lock it in position and prevent it from being released from the fitting.

Although certain preferred embodiments of the invention have been herein described in order to illustrate the principles of the invention, it will be understood that various changes and innovations can be made in the illustrated and described structure without departure from the basic principles of the invention. For example, in using the several system fittings herein described, it may, in some installations and applications, be desirable to use solvent bonding to join sections of conduit to each other in end-to-end relation, or to join the end portion of one or more conduit sections to or through a particular fitting. This technique is generally well understood in the art, and where it might be used in the system of the invention, does not, per se, constitute a novel aspect thereof. Changes and innovations which continue to rely upon and include one or more of the novel features of the system of the invention are thus contemplated, and such modified systems are therefore deemed to be circumscribed by the spirit and scope of the invention except as the same is necessarily limited by the appended claims or reasonable equivalents thereof.

What is claimed is:

1. An electrical conduit system comprising:
   a plurality of synthetic resin, externally corrugated, manually bendable tubular conduits each having first and second ends;
   a synthetic resin box having side walls with a plurality of said side walls each defining a conduit opening in said box;
   inlet fittings within each of said conduit openings and engaging the respective opening-defining wall of the box, and engaging the corrugations of a portion of one of said conduits which is adjacent one of the ends of said one conduit, each of said inlet fittings comprising:
      an annular element having a peripheral, radially inwardly extending groove therearound, and having an annular flange extending axially from said groove and gradually narrowing in thickness in a radial sense such that said flange has a relatively sharp, axially directed edge to facilitate forced wedging insertion of said fitting axially through a circular opening in a wall of the box to snap the wall adjacent the opening into said groove;
      a radially inwardly extending, relatively flexible receptor plate formed integrally with said annular element; and
      a centrally apertured hub at the radially inner side of said receptor plate having a plurality of contiguous, annular serrations therein for registry and engagement with the corrugations of said tubular conduits;
      wherein said inlet fittings and said ends of said conduits are sufficiently flexible to permit one of said ends of one of said conduits to be forced through said centrally apertured hub for registered snap engagement therewith;
   means interconnecting an end of another of said conduits with the second end of one of said conduits having its corrugations engaged by one of said inlet fittings, said interconnecting means comprising:

two convergent movable synthetic elements each having means engaging corrugations of at least one of said interconnecting conduits; and means for releasably converging said movable elements into engagement with one of said interconnected conduits; and a hanger sleeve surrounding a medial portion of one of said conduits and including means engaging the external corrugations of said one surrounded conduit to prevent movement of the surrounded conduit axially within said hanger sleeve.

2. The electrical conduit system of claim 1 wherein said hanger sleeve includes a body portion and said means of said hanger sleeve engaging the external corrugations of said one surrounded conduit comprises:

a first series of axially spaced, radially inwardly projecting trangularly cross-sectioned ribs along one side of said body portions; and a second series of axially spaced, radially inwardly projecting triangularly cross-sectioned ribs along an opposite side of said body portion;

wherein, said first and second series of ribs are geometrically configured to register with said corrugations in said one surrounded conduit as said hanger sleeve is closed around said conduit for bringing said first and second series of ribs into mating engagement with said corrugations.

* * * * *